United States Patent
Nishihara et al.

[11] Patent Number: 6,102,114
[45] Date of Patent: Aug. 15, 2000

[54] MULTI-ROOM AIR CONDITIONING SYSTEM

[75] Inventors: Yoshikazu Nishihara, Kouka-gun; Kuniyasu Uchiyama; Masanori Ogawa, both of Kusatsu; Youji Takanashi; Takahiko Ao, both of Otsu; Norimasa Ishikawa, Kusatsu, all of Japan

[73] Assignee: Matsushita Electric Industrial Co., Ltd., Osaka, Japan

[21] Appl. No.: 09/161,719

[22] Filed: Sep. 29, 1998

[30] Foreign Application Priority Data

Sep. 30, 1997  [JP]  Japan .................................. 9-267164

[51] Int. Cl.$^7$ .............................. F29B 29/00; F24F 11/02
[52] U.S. Cl. .......................... 165/207; 237/2 A; 237/2 B; 62/238.6; 62/238.7; 62/228.4; 62/324.6; 165/240
[58] Field of Search ...................... 237/2 B, 2 A; 62/238.7, 238.6, 228.4, 324.6; 165/240, 207

[56] References Cited

U.S. PATENT DOCUMENTS

| | | | |
|---|---|---|---|
| 4,506,521 | 3/1985 | Asano et al. | 62/238.7 |
| 4,553,401 | 11/1985 | Fisher | 237/2 B |
| 5,050,396 | 9/1991 | Ohkoshi et al. | 237/2 B |
| 5,169,063 | 12/1992 | Miyazaki et al. | 237/2 B |
| 5,343,935 | 9/1994 | Sumitani | 62/238.7 |

FOREIGN PATENT DOCUMENTS

| | | | |
|---|---|---|---|
| 2659641 | 7/1978 | Germany | 237/2 B |
| 3330097 | 3/1985 | Germany | 237/2 B |
| 3-36449 | 2/1991 | Japan | 237/2 B |
| 5-164421 | 6/1993 | Japan | 237/2 B |
| 6-26723 | 2/1994 | Japan | 237/2 B |
| 2249168 | 4/1992 | United Kingdom | 237/2 B |

*Primary Examiner*—John K. Ford
*Attorney, Agent, or Firm*—Wenderoth, Lind & Ponack, L.L.P.

[57] ABSTRACT

A multi-room air conditioning system includes an outdoor unit and a plurality of indoor units connected in parallel to the outdoor unit. A compressor frequency and combustion control calculator reads a load level for each indoor unit from a load coefficient table using a differential temperature calculated by a differential temperature calculator and a rated capacity stored in a rated capacity memory. The compressor frequency and combustion control calculator then multiplies a sum of the load levels by a predetermined constant and adds a compensation value thereto to obtain a frequency value. This value is used to control the compressor. The compressor frequency and combustion control calculator also sets a target combustion level using the frequency value for control of a refrigerant heater mounted in the outdoor unit.

10 Claims, 13 Drawing Sheets

Fig.3

| ΔT | FREQ. No. | |
|---|---|---|
| | COOLING | HEATING |
| +1.5 | Fcmax or Fc | 0 |
| +1.0 | 6 | 1 |
| +0.5 | 5 | 2 |
| +0.0 | 4 | 3 |
| -0.5 | 3 | 4 |
| -1.0 | 2 | 5 |
| -1.5 | 1 | 6 |
| | 0 | Fh or Fhmax |

ΔT = ROOM T. − T. SETTING
  (Tr)    (Ts)

MULTI-ROOM AIR CONDITIONING SYSTEM

BACKGROUND OF THE INVENTION

1. Field of the Invention

The present invention relates generally to an air conditioning system and, in particular but not exclusively, to a multi-room air conditioning system having one outdoor unit and a plurality of indoor units connected thereto wherein refrigerant circulation is controlled by a corresponding number of motor-driven expansion valves.

2. Description of the Related Art

Recently, a multi-room air conditioning system having a plurality of indoor units connected to a single outdoor unit is being gradually accepted to consumers of ordinary homes in view of a reduced outdoor space and the appearance. Compared with the case wherein a plurality of single-room air conditioners each having only one indoor unit connected to one outdoor unit are installed, the multi-room air conditioning system is advantageous in respect of the cost, resulting in a gradual increase in demand of consumers.

In the multi-room air conditioning system, the capacity of a compressor is controlled according to the total demand of the indoor units, while the opening of a flow control valve connected to each indoor unit is independently controlled according to the demand of the corresponding indoor unit.

However, because opening control of the flow control valves is separated for each indoor unit, various problems arise when there is a great difference in the required demand of the respective indoor units during heating mode operation.

By way of example, flow control by the flow control valves is carried out on downstream sides of the indoor units and, hence, a large amount of liquid refrigerant is apt to be collected in an indoor unit having a small demand load, giving rise to shortage of the refrigerant circulation in the whole refrigeration cycle. This in turn causes a problem in that control of only the opening of each motor-driven expansion valve cannot maintain the degree of superheat of the refrigerant substantially constant at a refrigerant heater outlet.

To solve this problem, if the heating capacity is reduced by reducing the output of the refrigerant heater or the ratio of heating capacity between the indoor units is reduced by increasing the minimum opening of the flow control valves, there arises a problem in that the specification of the air conditioning system is lowered.

In view of this problem, Japanese Laid-Open Patent Publication (unexamined) No. 5-26530 discloses an air conditioner capable of always ensuring an appropriate heating capacity by maintaining the degree of superheat of a refrigerant to a predetermined value at an outdoor heat exchanger on the heating source side even if there is a great difference between the heating demands of indoor units.

This air conditioner is provided with a refrigerant heater having a gas burner, a combustion fan, a proportional valve, an igniter, a flame detector and the like, wherein the refrigerant is heated by flames of the gas burner during heating mode operation. During the heating mode operation, if the difference between the demand loads of the indoor units is greater than a predetermined value, a two-way valve corresponding to an indoor unit having a greater demand load is opened, while a two-way valve corresponding to an indoor unit having a smaller demand load is closed. Concurrently therewith, the opening of flow control valves is controlled so that refrigerants entering respective indoor heat exchangers may be in a predetermined temperature relationship depending on the demand loads of the indoor units. Also, the opening of each motor-driven expansion valve is controlled while the total opening of all the motor-driven expansion valves is maintained constant so that the degree of supercooling may become equal to each other at the indoor heat exchangers.

Although a multi-room air conditioning system of a type wherein refrigerant is heated by an economical oil is now being examined, control of an oil heater is not easy compared with refrigerant heating with the use of flames of a gas burner because a large amount of refrigerant is filled in the system having a plurality of indoor units connected to a single outdoor unit. It is particularly important to control a balance between refrigerant heating and refrigerant circulation. In the multi-room air conditioning system, there is a significant change in refrigerant circulation. When the heat added exceeds the heat dissipation capacity of refrigerant circulation, an abnormal rise in the outlet temperature of the refrigerant heater or a rise in exhaust gas temperature occurs. In contrast, when refrigerant circulation exceeds the heating capacity of the heater, a drop in compressor reliability or a rise in the input to the compressor occurs.

Furthermore, a material having a relatively large heat capacity such as, for example, aluminum is employed in a combustor of the oil heater and, hence, the refrigerant temperature changes only a little even if the heat added changes considerably, making it difficult to control refrigerant heating.

SUMMARY OF THE INVENTION

The present invention has been developed to overcome the above-described disadvantages.

It is accordingly an objective of the present invention to provide a multi-room air conditioning system capable of effectively controlling refrigerant heating and refrigerant circulation depending on loads of the indoor units.

In accomplishing the above and other objectives, a multi-room air conditioning system according to the present invention includes an outdoor unit having a variable capacity compressor, a four-way valve, an outdoor heat exchanger and a refrigerant heater, and a plurality of indoor units each having an indoor heat exchanger and connected in parallel to the outdoor unit. The outdoor unit and the plurality of indoor units are connected to each other via a plurality of fluid distribution lines branched from a primary fluid line mounted in the outdoor unit and via a plurality of gas distribution lines branched from a primary gas line mounted in the outdoor unit. A plurality of motor-driven expansion valves are installed in the plurality of fluid distribution lines, respectively. The multi-room air conditioning system also includes a room temperature setting means for setting a desired temperature of a room in which each indoor unit is installed, a room temperature detecting means for detecting a room temperature, a differential temperature calculating means for calculating a differential temperature between the temperature set by the room temperature setting means and the room temperature detected by the room temperature detecting means, a rated capacity memory means for storing a rated capacity of each indoor unit, and a compressor frequency and combustion control calculating means for calculating a compressor frequency and a target combustion level of the refrigerant heater at regular time intervals. The compressor frequency and combustion control calculating means reads a first load level for each indoor unit from a first load coefficient table using the differential temperature calculated by the differential temperature calculating means and the rated capacity stored in the rated capacity memory means. The compressor frequency and combustion control calculating means then multiplies a sum of the first load levels by a predetermined constant and adds a compensation value thereto to obtain a frequency value to thereby control the compressor. The compressor frequency and combustion control calculating means also sets the target combustion level using the frequency value to thereby control the refrigerant heater.

Advantageously, the multi-room air conditioning system further includes a valve opening calculating means for calculating an opening of each expansion valve. The valve opening calculating means reads an initial opening of each expansion valve from an initial opening table indicative of the initial opening of the expansion valves using the rated capacity stored in the rated capacity memory means, and also reads a second load level for each indoor unit from a second load coefficient table using the differential temperature calculated by the differential temperature calculating means and the rated capacity. The valve opening calculating means then determines the opening of each expansion valve as a product of the initial opening and the second load level both read thereby to control each expansion valve.

During cooling or dehumidification mode operation, the compressor frequency is determined as follows:

single room operation: Hz=a1×(load level)+b1;

2-room operation: Hz=a1×(sum of load levels)+b1, when the sum of the load levels is smaller than a predetermined value; and 2-room operation: Hz=a2×(sum of load levels)+b2, when the sum of the load levels is equal to or greater than the predetermined value, where a1, a2, b1, and b2 are constants, a1>a2, b1<b2, and Hz is the compressor frequency.

During heating mode operation, the compressor frequency is determined as follows:

single room operation: Hz=a3×(load level)+b3; and 2-room operation: Hz=a4×(sum of load levels)+b4, where a3, a4, b3, and b4 are constants, a3>a4, b3<b4, and Hz is the compressor frequency.

When the total load level is smaller than a predetermined level, the compressor frequency is increased during 2-room operation relative to during single room operation, and when the total load level is equal to or greater than the predetermined level, the compressor frequency is increased during single room operation relative to during 2-room operation.

When the compressor frequency is identical during heating mode operation, a combustion level is set higher as the number of operating units is reduced.

In another form of the present invention, a multi-room air conditioning system includes an outdoor unit having a variable capacity compressor, a four-way valve, an outdoor heat exchanger, a refrigerant heater for heating a refrigerant with an oil and an oil supply unit for supplying the refrigerant heater with the oil, and a plurality of indoor units each having an indoor heat exchanger and connected in parallel to the outdoor unit. An expansion valve having a controllable opening is installed in each of a plurality of fluid distribution lines. This multi-room air conditioning system also includes an operation load determination means for controlling an amount of oil to be supplied from the oil supply unit according to a demand load of each indoor unit.

The multi-room air conditioning system further includes an air supply unit mounted in the outdoor unit for supplying the refrigerant heater with combustion air, wherein the operation load determination means also controls an amount of air to be supplied from the air supply unit.

In a further form of the present invention, a multi-room air conditioning system includes an outdoor unit having a variable capacity compressor, a four-way valve, an outdoor heat exchanger and a refrigerant heater disposed on a suction side of the compressor for heating a refrigerant with an oil, and a plurality of indoor units each having an indoor heat exchanger and connected in parallel to the outdoor unit.

An expansion valve having a controllable opening is installed in each of a plurality of fluid distribution lines.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 3 is a table showing temperature zone distribution of the temperature differential between room temperature and the temperature setting in the air conditioning system shown in FIG. 1;

DETAILED DESCRIPTION OF THE PREFERRED EMBODIMENTS

This application is based on an application No. 9-267164 filed Sep. 30, 1997 in Japan, the content of which i s incorporated hereinto by reference.

Figure 1:
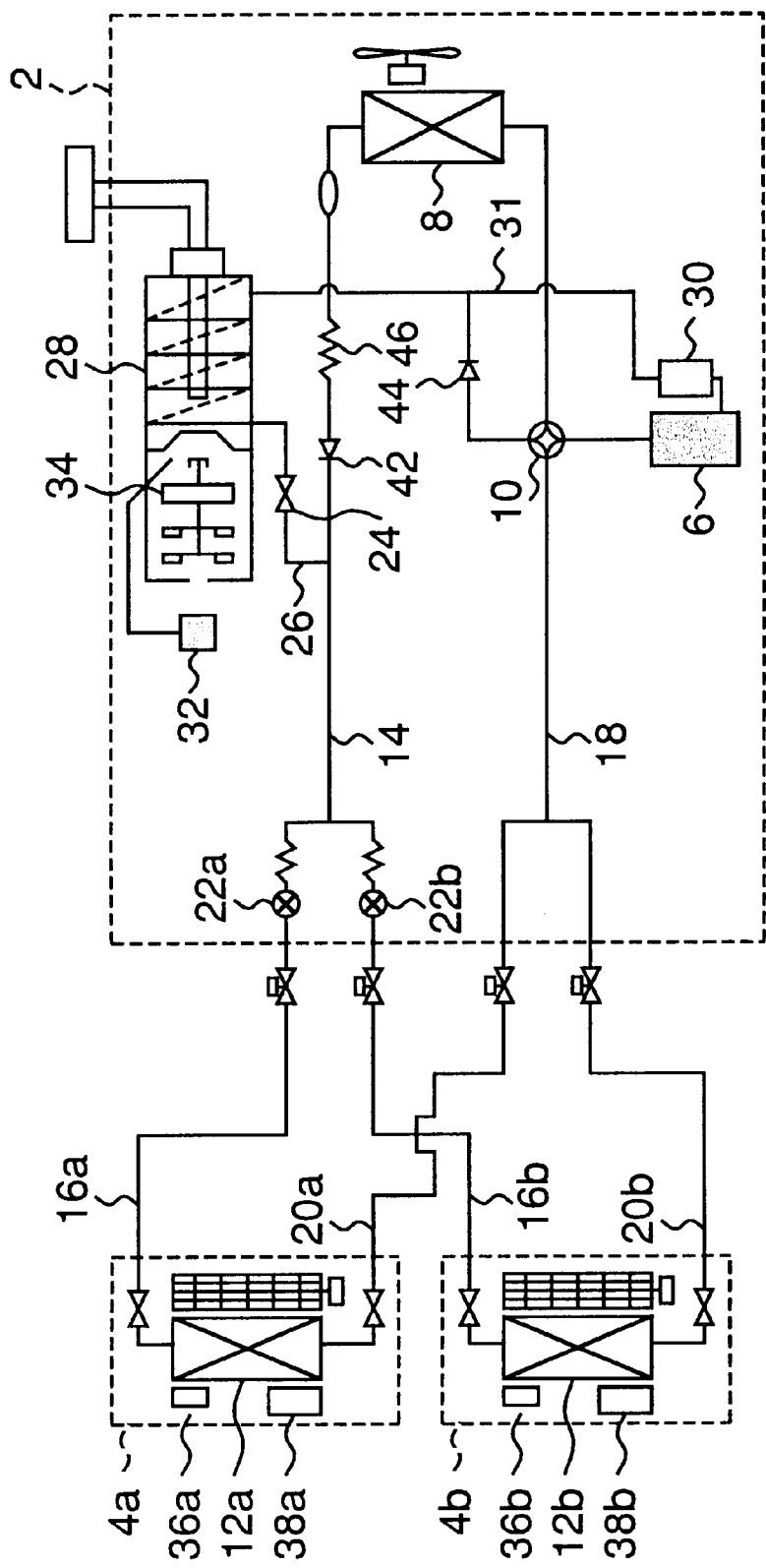
FIG. 1 is a circuit diagram showing the refrigeration cycle of an air conditioning system according to a preferred embodiment of the present invention.

FIG. 1 shows a refrigeration cycle of a multi-room air conditioning system embodying the present invention. This air conditioning system includes a single outdoor unit 2 and a plurality of, for example, two, indoor units 4a and 4b connected thereto.

As shown in FIG. 1, the outdoor unit 2 includes an inverter-driven, variable capacity (frequency) compressor 6, an outdoor heat exchanger 8, and a four-way valve 10 for heating and cooling mode selection. The indoor units 4a and 4b each include an indoor heat exchanger 12a and 12b, respectively.

The outdoor unit 2 and indoor units 4a and 4b are connected by fluid distribution lines 16a and 16b and gas distribution lines 20a and 20b. The fluid distribution lines 16a and 16b branch from a primary fluid line 14 in the outdoor unit 2, and the gas distribution lines 20a and 20b branch from a primary gas line 18 in the outdoor unit 2. A pulse-controllable motor-driven expansion valve 22a and 22b, the opening of which can be adjusted by a stepping motor, for example, is installed in the fluid distribution lines 16a and 16b.

A refrigerant heater line 26 also branches from the primary fluid line 14 and is wound around the refrigerant heater 28. A two-way valve 24 is installed in the refrigerant heater line 26. An intake line 31 connected between the refrigerant heater outlet and an accumulator 30 connects the refrigerant heater line 26 diverging from the primary fluid line 14 to the intake side of the compressor 6.

A solenoid pump 32 and a burner motor 34 are disposed near the refrigerant heater 28. The solenoid pump 32 provides a regulated supply of fuel, and the burner motor 34 supplies air, to the refrigerant heater 28 for combustion.

The indoor units 4a and 4b each further include a room thermometer 36a and 36b for detecting the temperature of the room in which the indoor unit 4a or 4b is located, and a control circuit 38a and 38b whereby a user can control the operating mode (heating or cooling), room temperature, and on or off status of the air conditioning system.

Note that check valves 42 and 44, and a flow restrictor 46, are further provided in the outdoor unit 2.

With the refrigeration cycle configured as shown in FIG. 1, coolant from the compressor 6 during cooling mode operation is directed by the four-way valve 10 to the outdoor heat exchanger 8 whereby heat is exchanged with the outdoor air and the refrigerant is condensed. The condensed refrigerant then passes the flow restrictor 46 whereby the refrigerant pressure is reduced and the refrigerant is converted to a more easily evaporated state. The condensed, low pressure refrigerant then flows from the primary fluid line 14 into the two fluid distribution lines 16a and 16b. The motor-driven expansion valves 22a and 22b are proportionally opened using a method described further below according to the cooling requirements of the respective indoor units 4a and 4b. The low pressure refrigerant thus flows to the indoor heat exchangers 12a and 12b at a flow rate proportional to the demand, evaporates, and is returned from the gas distribution lines 20a and 20b to the primary gas line 18. The gasified refrigerant thus passes back through the four-way valve 10, through the accumulator 30, and re-enters the intake side of the compressor 6.

Note that the compressor frequency is determined by a control method described below according to the total load on the system.

When the heating mode is selected, the two-way valve 24 is closed for a known period of time. Refrigerant circulating from the check valve 42, through the outdoor heat exchanger 8, and to the check valve 44 is thus recovered by the compressor 6 in a refrigerant recovery cycle. When the refrigerant recovery cycle is completed, the two-way valve 24 opens, allowing high temperature, high pressure refrigerant from the compressor 6 to pass the four-way valve 10 and flow from the primary gas line 18 to the gas distribution lines 20a and 20b. The high temperature, high pressure refrigerant thus flows to the indoor heat exchangers 12a and 12b where it condenses to a fluid. The pressure is then reduced by the motor-driven expansion valves 22a and 22b of the fluid distribution lines 16a and 16b to an intermediate pressure.

As during cooling mode operation, the motor-driven expansion valves 22a and 22b are controlled using a method described below according to the demand of the respective indoor units 4a and 4b, and the refrigerant thus flows to the indoor heat exchangers 12a and 12b at a rate proportional to the demand load.

The intermediate pressure refrigerant is passed from the primary fluid line 14 to the refrigerant heater line 26, through the two-way valve 24, and to the refrigerant heater 28. Controlled according to a heating method described below, the refrigerant heater 28 heats the refrigerant to a specific temperature, thus converting the refrigerant to a gas which is passed back through the accumulator 30 to the intake side of the compressor 6.

Figure 2:
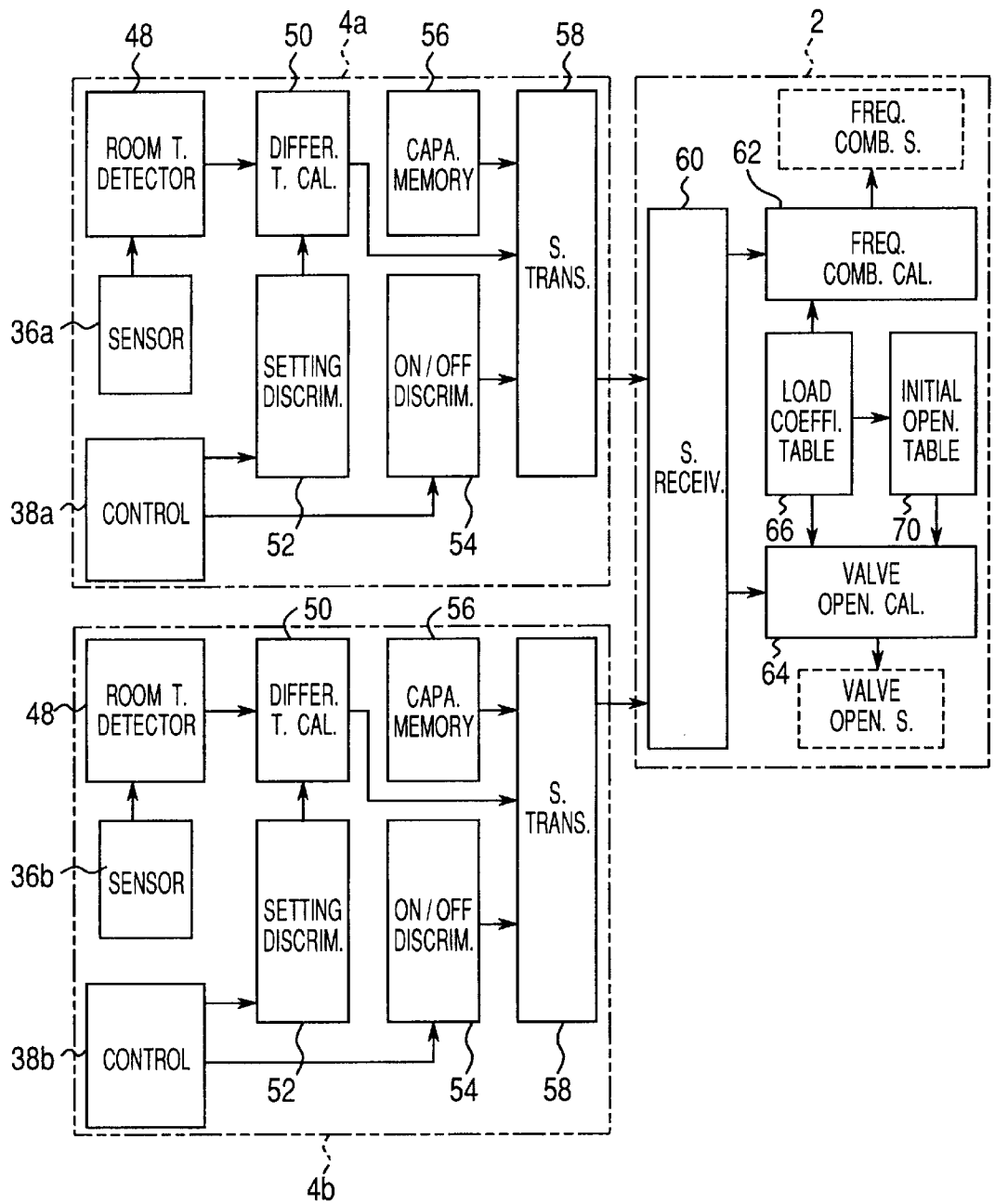
FIG. 2 is a block diagram of a control circuit in the air conditioning system shown in FIG. 1 whereby compressor frequency, combustion, and expansion valve opening are controlled.

Methods of controlling the compressor frequency, combustion, and opening of the motor-driven expansion valves, are described next below with reference to FIG. 2, a block diagram of the corresponding control circuits, and FIG. 3, a temperature zone distribution table for differential temperature $\Delta T$. Note that differential temperature $\Delta T$ is the room temperature Tr minus the temperature setting Ts.

A room temperature detection circuit 48 of one indoor unit 4a detects the temperature of the room in which the indoor unit 4a is located (simply the "room temperature" below) based on the output of the corresponding room thermometer 36a, and sends the resulting temperature signal (Tr) to a differential temperature calculator 50. Substantially concurrently, a setting discriminator 52 determines the temperature (Ts) and operating mode set by the control circuit 38a, and supplies this information to the differential temperature calculator 50. The differential temperature calculator 50 thus calculates the differential temperature $\Delta T$ (=Tr–

Ts), and converts the differential temperature ΔT to a frequency number as shown in FIG. 3 to obtain the differential temperature signal.

An ON/OFF discriminator 54 determines whether the indoor unit 4a has been turned on or off by the control circuit 38a. The rated capacity of the indoor unit 4a is stored in a rated capacity memory 56.

The rated capacity signal from the rated capacity memory 56, the differential temperature signal from the differential temperature calculator 50, and the operating mode signal and on/off status signal from the ON/OFF discriminator 54, are passed by a signal transmission circuit 58 of the indoor unit 4a to a signal reception circuit 60 of the outdoor unit 2. Note that these signals are sent from each of the indoor units to the outdoor unit 2.

The signals received by the signal reception circuit 60 are selectively sent to a compressor frequency and combustion control calculator 62 and valve opening calculator 64. If there is a conflict between the selected operating modes, that is, if one indoor unit is set for heating and another is set for cooling, the operating mode selected by the indoor unit from which a signal is first received determines whether the outdoor unit 2 operates in a heating or cooling mode. The indoor unit set to a different operating mode in this case is assumed to be off, and the on/off status signal for that indoor unit is set an off state.

Based on the rated capacity signal, differential temperature signal, operating mode signal, and on/off status signal from each of the indoor units 4a and 4b, the compressor frequency and combustion control calculator 62 reads the load level coefficient for each indoor unit from a load coefficient table 66, shown as the following Table 1. The calculator 62 then multiplies the sum of the load level coefficients by a known constant and adds a compensation value to determine the frequency of the compressor 6.

TABLE 1

| Cooling, dehumidification cycle | | | | | | | | Fc | Fcmax |
|---|---|---|---|---|---|---|---|---|---|
|  | 0 | 1 | 2 | 3 | 4 | 5 | 6 | 7 | 8 |
| 2.2 kw | 0 | 8 | 10 | 11 | 12 | 14 | 16 | 18 | 20 |
| 2.5 kw | 0 | 10 | 11 | 12 | 14 | 16 | 18 | 20 | 22 |
| 2.8 kw | 0 | 11 | 12 | 14 | 16 | 18 | 20 | 22 | 24 |
| 3.2 kw | 0 | 12 | 14 | 16 | 18 | 20 | 22 | 24 | 27 |
| Heating | | | | | | | | Fh | Fhmax |
|  | 0 | 1 | 2 | 3 | 4 | 5 | 6 | 7 | 8 |
| 2.2 kw | 0 | 20 | 23 | 26 | 29 | 31 | 34 | 38 | 40 |
| 2.5 kw | 0 | 21 | 24 | 27 | 31 | 35 | 39 | 43 | 45 |
| 2.8 kw | 0 | 22 | 26 | 30 | 34 | 38 | 43 | 48 | 50 |
| 3.2 kw | 0 | 23 | 27 | 31 | 35 | 40 | 47 | 55 | 67 |

More specifically, the compressor frequency value (No.) obtained from the table in FIG. 3 represents the differential temperature signals of the two indoor units 4a and 4b. During a cooling or dehumidification operating mode, the load level coefficients Ln1 and Ln2 are obtained from the load coefficient table 66 (Table 1) based on the supplied compressor frequency value (No.), and the total load Lnφ of the indoor units 4a and 4b is calculated. The operating frequency of the compressor 6 is set to the resulting value to regulate initial operation of the outdoor unit 2 in the cooling or dehumidification mode.

During heating mode operation, the load level coefficients Ln1 and Ln2 of the two indoor units 4a and 4b are again obtained from the load coefficient table 66 (Table 1) based on the supplied compressor frequency value (No.), and the total load Lnφ of the indoor units 4a and 4b is calculated to set the load level Lnk of the outdoor unit 2. The operating frequency of the compressor 6 is then set to this load level Lnk to regulate initial operation of the outdoor unit 2 in the heating mode.

The following equations are used to calculate the control values during cooling or dehumidification mode and during heating mode.

A. Control Equations for Cooling or Dehumidification
 1) Single room operation $$Ln\phi = a1 \times Ln1 + b1,$$

or $$Ln\phi = a1 \times Ln2 + b1$$

2) 2-room operation
 (i) if Ln1+Ln2<34

$$Ln\phi = a1 \times (Ln1 + Ln2) + b1$$

(ii) if Ln1+Ln2≧34

$$Ln = a2 \times (Ln1 + Ln2) + b2$$

where a1>a2, and b1<b2.

The operating frequency of the compressor 6 is set to the value of Lnφ obtained by the appropriate equation above (Comp Hz=Lnφ).

B. Control Equations for Heating
 1) Single room operation $$Ln\phi = a3 \times Ln1 + b3,$$

or $$Ln\phi = a3 \times Ln2 + b3$$

2) 2-room operation $$Ln\phi = a4 \times (Ln1 + Ln2) + b4$$

where a3>a4, and b3<b4.

The resulting value of Lnφ is then substituted for Lnk, and the operating frequency of the compressor 6 is set to the value of Lnk.

Lnk=Lnφ

Comp Hz=Lnk

Note that the values of a1 to a4, and b1 to b4, above are experimental values determined according to the capacity of the compressor 6, refrigerant line size, and other variable parameters.

Figure 4:
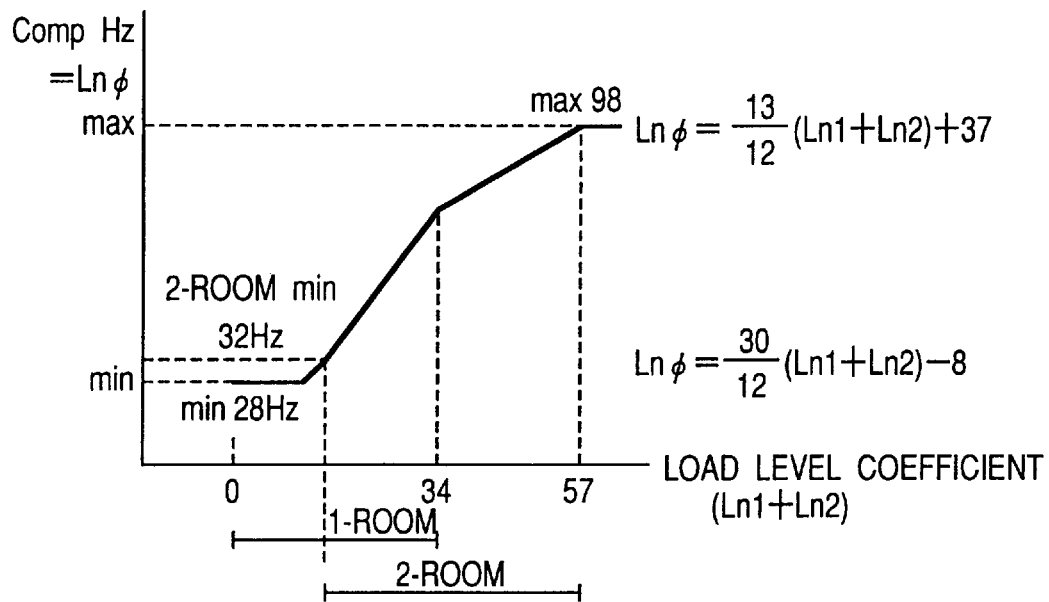
FIG. 4 is a graph showing the results of a control equation used for determining the compressor frequency during cooling or dehumidification mode operation in the air conditioning system shown in FIG. 1.
Figure 5:
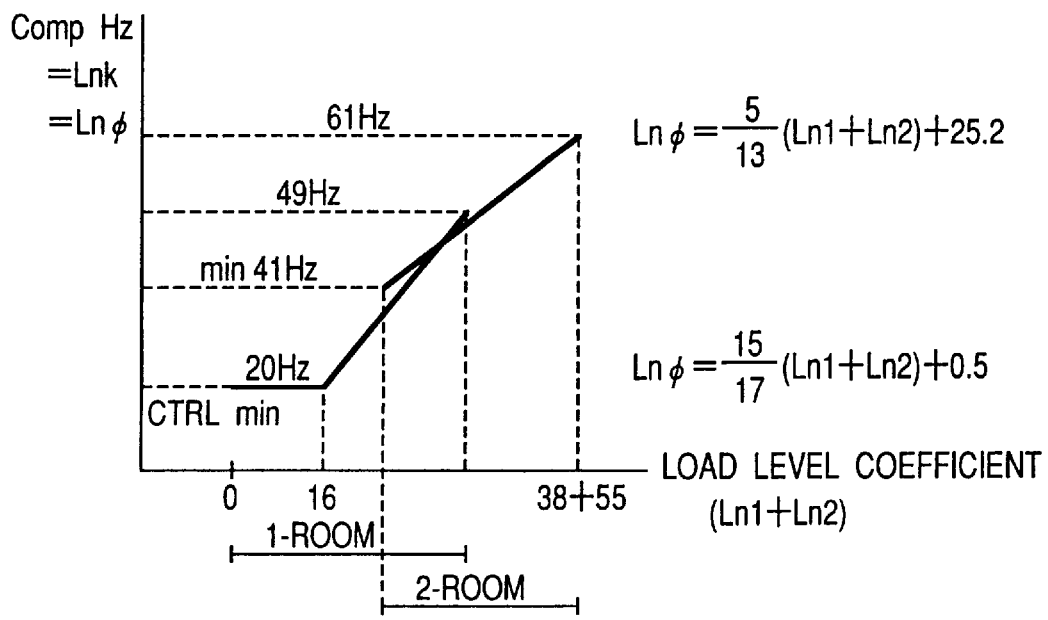
FIG. 5 is a graph showing the results of a control equation used for determining the compressor frequency during heating mode operation in the air conditioning system shown in FIG. 1.

Results obtained from the above equations are graphed in FIG. 4 and FIG. 5 where the following values were used in the calculations.

a1=30/12 b1=−8 a2=13/12 b2=37 a3=15/17 b3=0.5 a4=5/13 b4=25.2

As shown in FIG. 4, the minimum operating frequency to which the compressor 6 can be set during single room, cooling/dehumidification mode operation is 28 Hz. During two-room operation, the minimum operating frequency is 32

Hz, a level at which low frequency protection does not operate. The maximum operating frequency is 98 Hz.

As shown in FIG. 5, the minimum operating frequency to which the compressor 6 can be set during single and two room, heating mode operation is 20 Hz and 41 Hz, respectively. The maximum operating frequency in these modes is 49 Hz and 61 Hz, respectively.

Exemplary signals from the indoor units 4a and 4b are shown in Table 2 and described below.

TABLE 2

| Indoor unit | Op. mode | ON/OFF signal | Rated cap. | Freq. No. |
|---|---|---|---|---|
| 4a | heating | on | 2.2 kW | 6 |
| 4b | heating | on | 2.5 kW | 4 |

From Table 1 and Table 2, the load level coefficients Ln1 and Ln2 of the indoor units 4a and 4b are 34 and 31, respectively. The frequency Hz of the compressor 6 is therefore $$Hz = Ln\phi = 5/13 \times (34+31) + 25.2 \approx 50.$$

The result of this calculation is converted to a frequency signal sent to a compressor drive circuit (not shown) for frequency control of the compressor 6. The compressor frequency and combustion control calculator 62 thereafter regularly repeats the above calculations based on the rated capacity signal, differential temperature signal, operating mode signal, and on/off status signal from each of the indoor units 4a and 4b, corrects the result as required, and sends the corrected value to the compressor drive circuit as the frequency signal used for frequency control of the compressor 6.

As described above, the frequency of the compressor 6 is determined using a specific calculation method according to the number of operating indoor units. During low frequency operation with a single indoor unit, low input load operation is thus possible by driving the compressor 6 at a low operating frequency. As the total load increases, the operating frequency of the compressor 6 can be increased to compensate for pressure loss from the refrigerant lines, thereby assuring high refrigerant circulation and high efficiency operation. When two or more indoor units are operating in the heating mode, the compressor 6 must be driven at a higher frequency even if the total indoor demand is the same as that with single indoor unit operation in order to compensate for the increased volume of the lines carrying the refrigerant. However, line pressure loss increases significantly with single indoor unit operation after a certain point, and a higher compressor frequency is therefore required with single indoor unit operation.

The expansion valve opening is determined in a manner similar to that described above by the expansion valve opening calculator 64. That is, a load level coefficient is selected from load coefficient tables 66 (Table 3 below) based on the rated capacity signal, differential temperature signal, operating mode signal, and on/off status signal output by each of the indoor units 4a and 4b, and an initial valve opening value is then read from an initial valve opening table 70 (Table 4 below) based on the rated capacity of the indoor units 4a and 4b. Note that the initial valve opening is determined so that each indoor unit can be controlled to exhibit a predetermined performance even when indoor units of different rated capacities are used in combination.

TABLE 3

| Cooling, dehumidication cycle P0-value | 0 | 1 | 2 | 3 | 4 | 5 | 6 | Fc 7 | Fcmax 8 |
|---|---|---|---|---|---|---|---|---|---|
| 2.2 kw | shut | 0.7 | 0.8 | 0.8 | 0.85 | 0.85 | 0.95 | 1.0 | 1.2 |
| 2.5 kw | shut | 0.7 | 0.8 | 0.8 | 0.85 | 0.85 | 0.95 | 1.0 | 1.2 |
| 2.8 kw | shut | 0.7 | 0.8 | 0.8 | 0.85 | 0.85 | 0.95 | 1.0 | 1.2 |
| 3.2 kw | shut | 0.7 | 0.8 | 0.8 | 0.85 | 0.85 | 0.95 | 1.0 | 1.2 |
| Heating P0-value | 0 | 1 | 2 | 3 | 4 | 5 | 6 | Fh 7 | Fhmax 8 |
| 2.2 kw | shut | 0.8 | 0.85 | 0.85 | 0.9 | 0.95 | 1.0 | 1.1 | 1.2 |
| 2.5 kw | shut | 0.8 | 0.85 | 0.85 | 0.9 | 0.95 | 1.0 | 1.1 | 1.2 |
| 2.8 kw | shut | 0.8 | 0.85 | 0.85 | 0.9 | 0.95 | 1.0 | 1.1 | 1.2 |
| 3.2 kw | shut | 0.8 | 0.85 | 0.85 | 0.9 | 0.95 | 1.0 | 1.1 | 1.2 |

Note that P0-value is the load level coefficient, and "shut" indicates the valve is completely closed.

TABLE 4

| | Initial opening (pulses) | |
|---|---|---|
| | Cool/dehumidify | Heat |
| 2.2 kw | 180 | 350 |
| 2.5 kw | 230 | 380 |
| 2.8 kw | 280 | 420 |
| 3.2 kw | 350 | 480 |

The opening of expansion valves 22a and 22b is determined as the product of the respective load level coefficient and the initial valve opening as shown in the following equation $$\text{valve opening} = P0 \times \text{initial pulse count}$$

where P0 is the load level coefficient and the initial pulse count is the value obtained from Table 4.

In the above example, the load level coefficients of the indoor units 4a and 4b are 1.0 and 0.9, and the respective initial valve opening counts are 350 and 380. The valve openings for the expansion valves 22a and 22b are thus 350 and 342. The resulting valve opening values are then applied as an expansion valve opening signal to the respective valve drive circuits (not shown).

The actual physical openings of the expansion valves 22a and 22b are thus regulated by driving the respective valve motors 350 and 342 pulses. The valve opening is thereafter recalculated for each valve at a regular period using the method described above, the calculated results are corrected as required, and the corrected value is applied as an expansion valve opening signal to the expansion valve drive circuit.

Problems unique to heating mode combustion control in the above multi-room air conditioning system are described immediately below.

When operating in the heating mode, the refrigerant outlet temperature of the refrigerant heater 28 is balanced based on the temperature (combustion) of the refrigerant heater 28 and the refrigerant temperature in the refrigerant lines (refrigerant circulation). If combustion (refrigerant heater temperature) is high relative to refrigerant circulation, the refrigerant outlet temperature will rise; if combustion is low relative to circulation, the refrigerant outlet temperature will drop. Why this occurs in a multi-room air conditioning system is described below.

As individual indoor units are operated (turned on and off, or the operating mode changes), there can be a significant change in the total effective length of the refrigerant lines carrying refrigerant at any particular time. Refrigerant circulation can therefore change significantly, producing significant variation in the refrigerant outlet temperature of the refrigerant heater.

The large amount of refrigerant required to charge the system means the amount of refrigerant to be heated changes significantly as the indoor units are operated. This change in the amount of circulating refrigerant subtly affects refrigerant heater temperature.

Compared with a single-room air conditioning system, there is a greater change in the refrigeration cycle at maximum operating capacity. Precise temperature control is also required at minimum operating capacity, the balance between combustion and refrigerant circulation during refrigeration cycle control is easily disrupted, and the refrigerant temperature can thus vary widely.

The following problems can arise as a result of a rise or drop in the refrigerant outlet temperature.

(i) When the refrigerant outlet temperature rises

Performance drops (heat exchanger efficiency drops)

As the temperature rise increases, the refrigerant heater and compressor are turned off to protect them against damage. This leads to shortened heater and relay life due to repeatedly turning the burner on and off, as well as reduced comfort.

When the temperature rises abnormally, the refrigeration cycle oil carbonizes, impairing compressor lubrication, and leading to compressor damage. The aluminum housing of the refrigerant heater, and the copper tubing wound to the refrigerant heater, can also become deformed and damaged.

The exhaust gas temperature rises.

(ii) When the refrigerant outlet temperature drops

A drop in refrigerant superheating results in compressor fluid compression (fluid return), which in turn causes abnormal shaft wear.

Condensation forms in the refrigerant heater. This condensation mixes with sulfur oxide by-products from combustion, forming sulfuric acid, which corrodes aluminum.

The input load rises.

To avoid the above-noted problems, combustion is controlled by the method described below in a multi-room air conditioning system according to the present invention.

The frequency value (No.) of the compressor 6 is set by each indoor unit 4a and 4b based on the difference between the intake temperature and the temperature setting of the indoor unit, and is output to the outdoor unit 2.

The outdoor unit 2 derives the load level coefficients Ln1 and Ln2 from a performance ranking of the indoor units 4a and 4b, and the frequency value (No.), and the total load $Ln\phi$ is calculated. The total load $Ln\phi$ is then substituted for load level Lnk, and the preferred combustion level (K) is calculated from the following equations to determine the operating load level of the outdoor unit.

Calculating the preferred combustion level (K)

1) With one indoor unit operating $$K=-(256-K1_{max})/(Lnk1_{max}-Lnk1_{min})\times(Lnk-Lnk1_{min})+256$$

2) With two indoor units operating $$K=-K2_{min}/(Lnk2_{max}-Lnk2_{min})\times(Lnk-Lnk2_{min})+K2_{min}$$

where $K1_{max}$, $K2_{min}$, $Lnk1_{min}$, $Lnk1_{max}$, $Lnk2_{min}$, and $Lnk2_{max}$ are defined as follows:

$K1_{max}$: 69
$K2_{min}$: 145
$Lnk1_{min}$: 20
$Lnk1_{max}$: 42
$Lnk2_{min}$: 42
$Lnk2_{max}$: 61.

Figure 6:
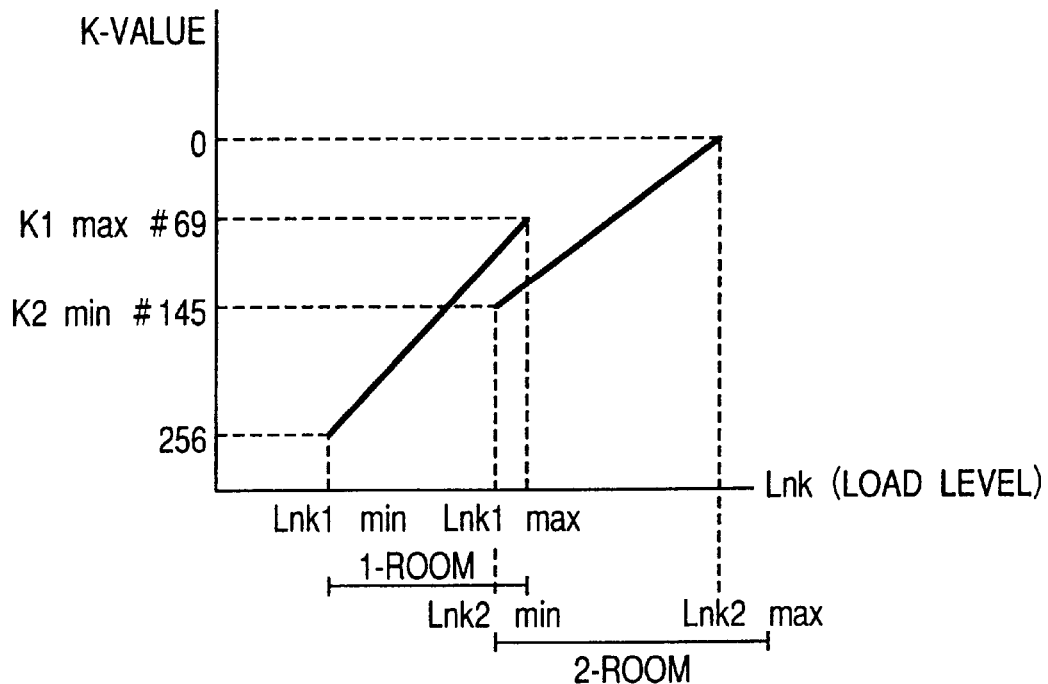
FIG. 6 is a graph showing the results of a control equation used for determining the combustion level (K) during heating mode operation in the air conditioning system shown in FIG. 1.
Figure 7:
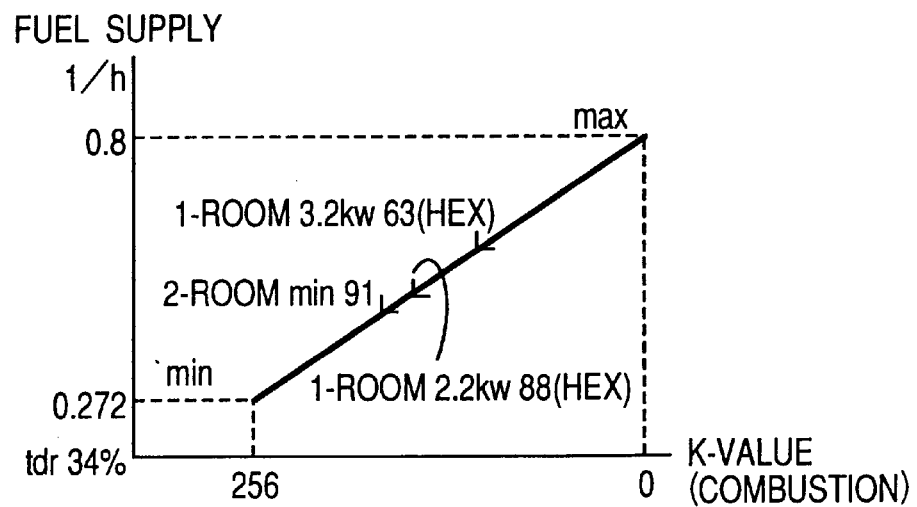
FIG. 7 is a graph showing the relationship between the combustion level (K) determined from FIG. 6 and the fuel supply in the air conditioning system shown in FIG. 1.

The above control equation is graphed in FIG. 6. Note that the preferred combustion level (K) for the indicated refrigerant circulation is determined with consideration for the fuel supply as shown in FIG. 7, for example. When the preferred combustion level (K) is calculated, the solenoid pump 32 frequency and burner motor 34 speed settings are initialized according to the resulting value of K to appropriately set and regulate the fuel supply and air supply. That is, an operation load determination means for controlling, based on the demand load of the respective indoor units 4a and 4b, a fuel supply unit (solenoid pump 32) that supplies fuel to the refrigerant heater 28 and an air supply unit (burner motor 34) that supplies air to the refrigerant heater 28 for combustion is comprised of the differential temperature calculator 50, the compressor frequency and combustion control calculator 62, the load coefficient table 66, and the like. The expansion valves 22a and 22b linked to the indoor units 4a and 4b are also initialized based on the frequency values (No.) output from the indoor units 4a and 4b, that is, the compressor frequency is controlled using the same method used in the cooling mode. It should be noted that the combustion level can be determined in a manner similar to the determination of the compressor frequency.

Note, further, that the relationship between the maximum combustion level with single room operation, and the minimum combustion level with two-room operation, is defined such that, insofar as the compressor frequency remains the same, the combustion level is higher for the configuration having fewer operating indoor units. This is because refrigerant line pressure loss is greater relative to refrigerant circulation with single room operation, and combustion must therefore be greater with single room operation at a particular compressor frequency.

By thus controlling the compressor frequency according to the total required demand from all rooms, and determining the opening of the individual expansion valves 22a and 22b according to the load from each room, using the control method described above, the required heating or cooling capacity can be delivered as required to each room.

It is therefore possible to improve room comfort and reduce energy consumption while precisely and optimally controlling the refrigeration cycle.

A preferred method of controlling a variable number of operating units is described next below with reference to a flow chart in FIG. 8 and a timing chart in FIG. 9. It is assumed by way of example below that one of the two indoor units 4a and 4b is initially operating in the heating mode, and at some later point the other unit also begins operating in the heating mode.

The rooms in which the indoor units 4a and 4b are located are designated room A and room B, respectively. At first, only the indoor unit 4a of room A is operating in the heating mode. The other indoor unit 4b in room B then starts operating in the heating mode. Immediately after indoor unit 4b starts, the expansion valve 22b corresponding to room B is opened so that the refrigerant flows to both indoor unit 4a in room A and indoor unit 4b in room B. Refrigerant flow to the refrigerant heater 28 therefore drops. As a result, the balance between refrigerant heating and refrigerant circulation is disrupted, creating the potential for an abnormal rise in the refrigerant outlet temperature of the refrigerant heater 28.

Figure 8:
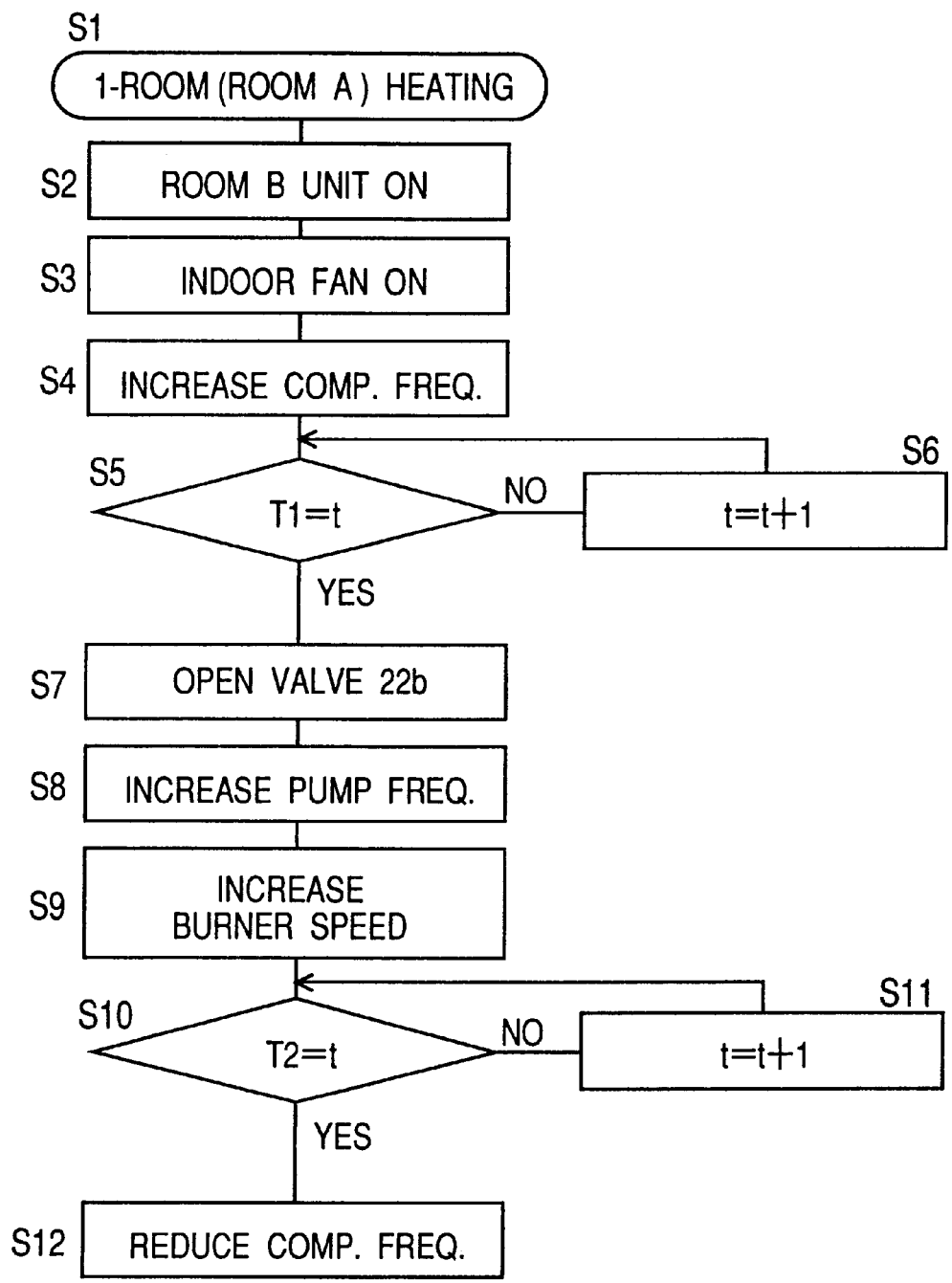
FIG. 8 is a flow chart used to describe the control process implemented when one indoor unit is operating in a heating mode, and a second indoor unit is then turned on, in the air conditioning system shown in FIG. 1.

Referring to the flow chart in FIG. 8, operation starts with the indoor unit 4a of room A operating in the heating mode (step S1). To avoid the above abnormal temperature rise when a heating mode operating signal is received for the indoor unit 4b in room B (step S2), the fan of the indoor unit 4b is turned on (step S3), and refrigerant circulation is increased (step S4) by gradually increasing the compressor frequency to a predefined high frequency setting (61 Hz in this example) or to a frequency level calculated based on the room load. Elapsed time counters T1 and T2 for tracking the time from receipt of the operating signal are also initialized and begin incrementing.

When elapsed time T1 reaches a specific time t, which is 30 seconds in the present embodiment (steps S5 and S6), the expansion valve 22b for the room B indoor unit 4b is opened (step S7). The solenoid pump 32 frequency and burner motor 34 speed are then gradually increased (steps S8 and S9) to gradually increase refrigerant heater 28 combustion.

It should be noted that the rate of increase in the solenoid pump 32 frequency and burner motor 34 speed is controlled to less than the rate of increase in the compressor 6 frequency to prevent an abnormal rise in the refrigerant temperature. It should also be noted that combustion can be increased simultaneously to or slightly delayed from opening of the expansion valve 22b. However, if combustion is increased before the expansion valve 22b is opened, an abnormal rise in the refrigerant outlet temperature of the refrigerant heater 28 is an obvious danger.

When the elapsed time T2 from receipt of the operating signal increments to a second specific time t, which in this example is 180 seconds (steps S10 and S11), the compressor frequency is reduced in steps to a value determined from the room load (step S12).

Figure 9:
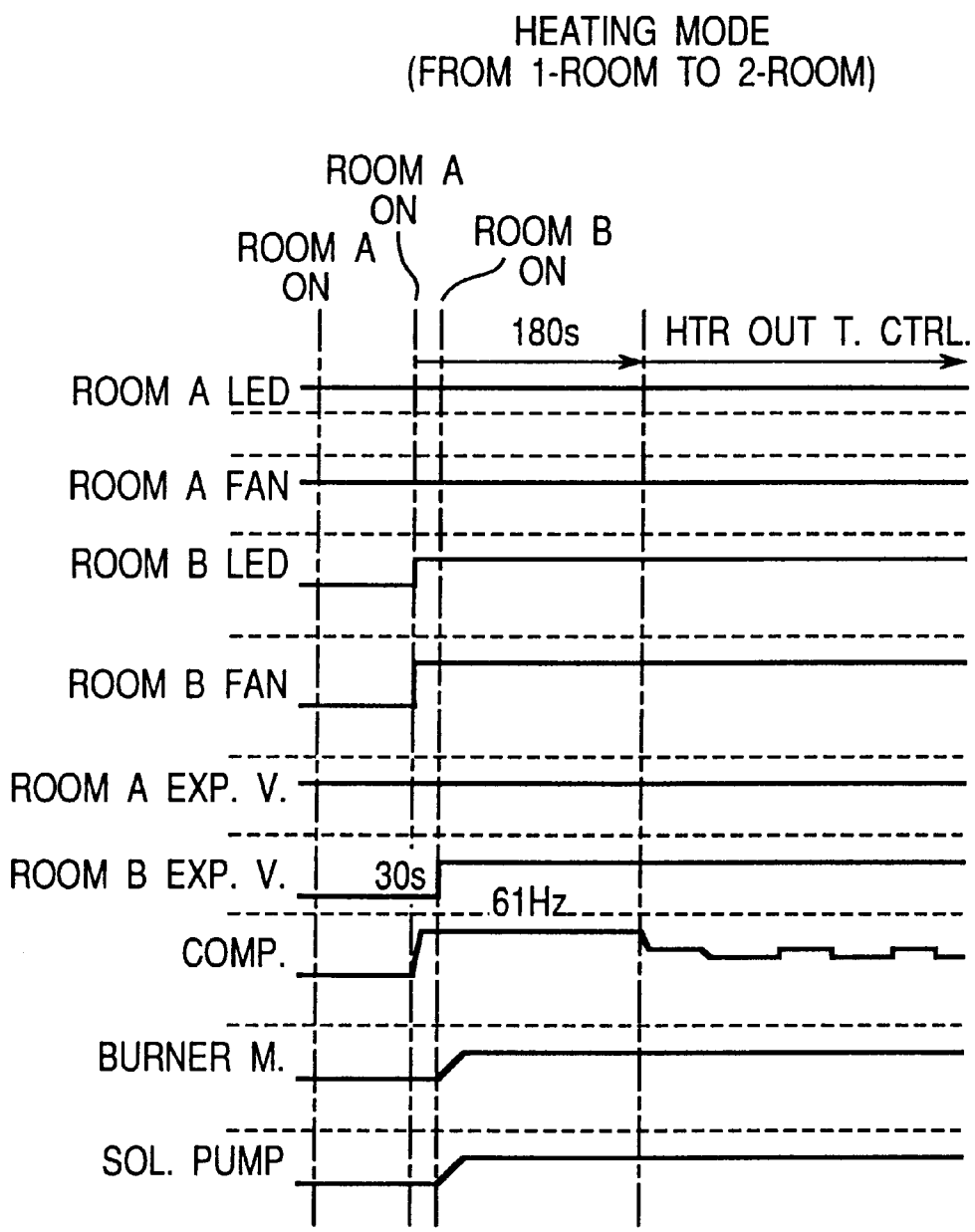
FIG. 9 is a timing chart used to describe the control process implemented when one indoor unit is operating in a heating mode, and a second indoor unit is then turned on, in the air conditioning system shown in FIG. 1.

It should be noted that increasing the compressor frequency and operating the indoor unit fan are shown as occurring simultaneously in the flow chart in FIG. 8 and the timing chart in FIG. 9. It is certainly possible, however, to delay fan operation for a specific period from when the compressor frequency is increased. Refrigerant heater combustion is also described as increasing gradually and continuously, but this process can be modified to increase in discrete steps. In this case, the average rate of increase in combustion must be set to less than the rate of increase in the compressor frequency.

A further preferred method of controlling a variable number of operating units is described next below with reference to a flow chart in FIG. 10 and a timing chart in FIG. 11. In this case it is assumed by way of example that the two indoor units 4a and 4b are both operating in the heating mode, and at some later point one of the two units, specifically indoor unit 4b in the following example, is turned off.

Figure 10:
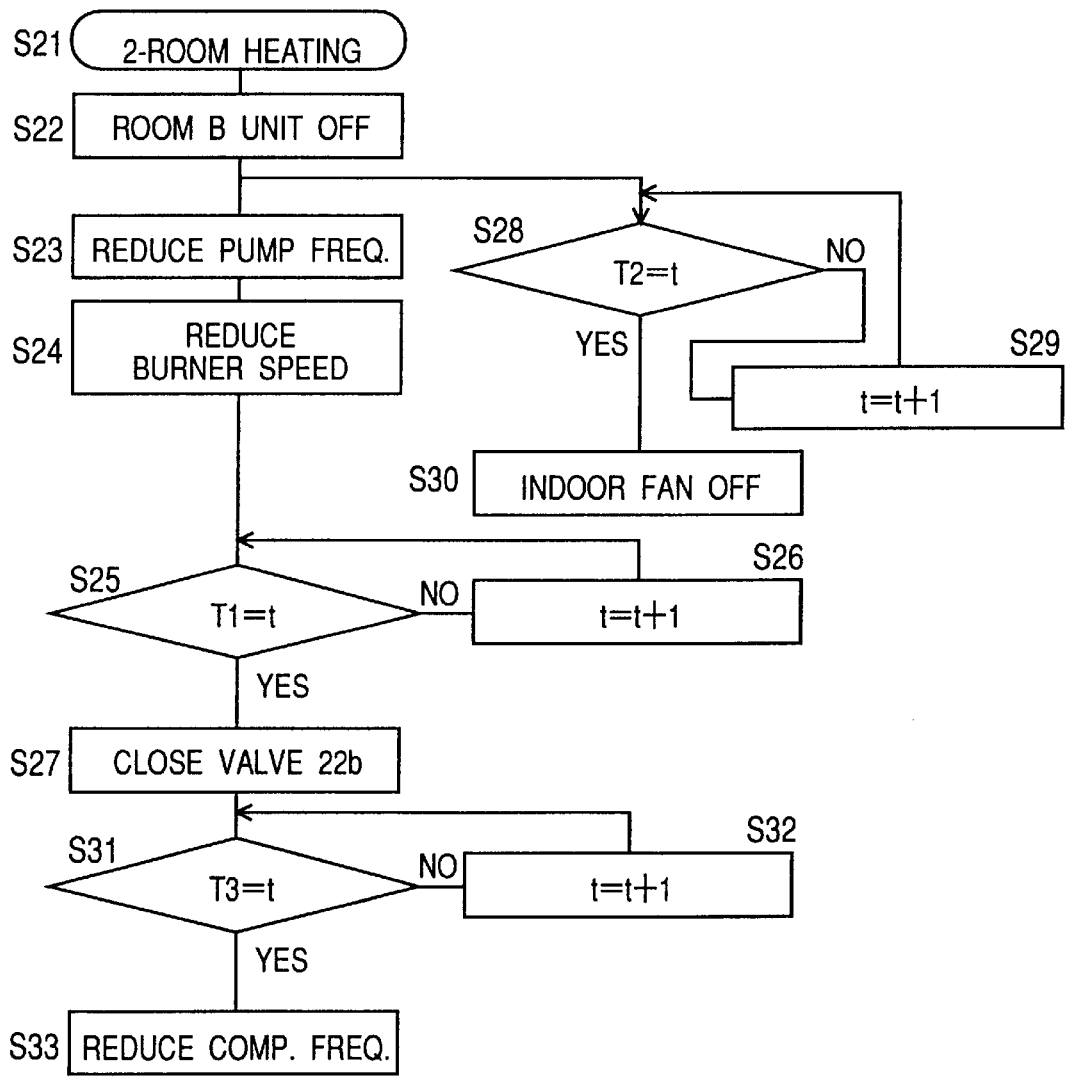
FIG. 10 is a flow chart used to describe the control process implemented when two indoor units are operating in a heating mode, and one indoor unit is then turned off, in the air conditioning system shown in FIG. 1.

Referring now to the flow chart in FIG. 10, operation starts with both indoor units 4a and 4b operating in the heating mode (step S21). When a signal indicating that the indoor unit 4b is turned off (step S22) is then received, elapsed time counters T1, T2 and T3 for tracking the time from receipt of the stop (off) signal are initialized and begin incrementing. Refrigerant heater 28 combustion is also reduced by gradually reducing the solenoid pump 32 frequency and burner motor 34 speed (steps S23 and S24).

When elapsed time T1 reaches a specific time t, which is 60 seconds in the present embodiment (steps S25 and S26), the expansion valve 22b for the room B indoor unit 4b is gradually closed (step S27).

When elapsed time T2 reaches a specific time t, which is 90 seconds in the present embodiment (steps S28 and S29), the fan of the indoor unit 4b is turned off (step S30).

When elapsed time T3 reaches a specific time t, which is 210 seconds in the present embodiment (steps S31 and S32), the compressor frequency is reduced (step S33) in discrete steps to a specific calculated value. This value is calculated by the compressor frequency and combustion control calculator 62 based on the total demand load of the rooms. By thus decreasing refrigerant circulation, the balance between refrigerant heating and refrigerant circulation is maintained, and an abnormal rise in the refrigerant outlet temperature of the refrigerant heater 28 can be prevented.

It should be noted that the delay time between receiving the stop (off) signal and actually stopping the indoor unit fan depends on the heat capacity of the burner. It therefore follows that this delay time must be increased if the heat capacity of the burner is high.

Data obtained as a result of varying the number of operating indoor units in a multi-room air conditioning system according to the present invention are graphed in FIG. 12 to FIG. 15. Data obtained when switching from one indoor unit operation to two indoor unit operation are graphed in FIG. 12 and FIG. 13, and data obtained when switching from two indoor unit operation to one indoor unit operation are graphed in FIG. 14 and FIG. 15.

Figure 12:
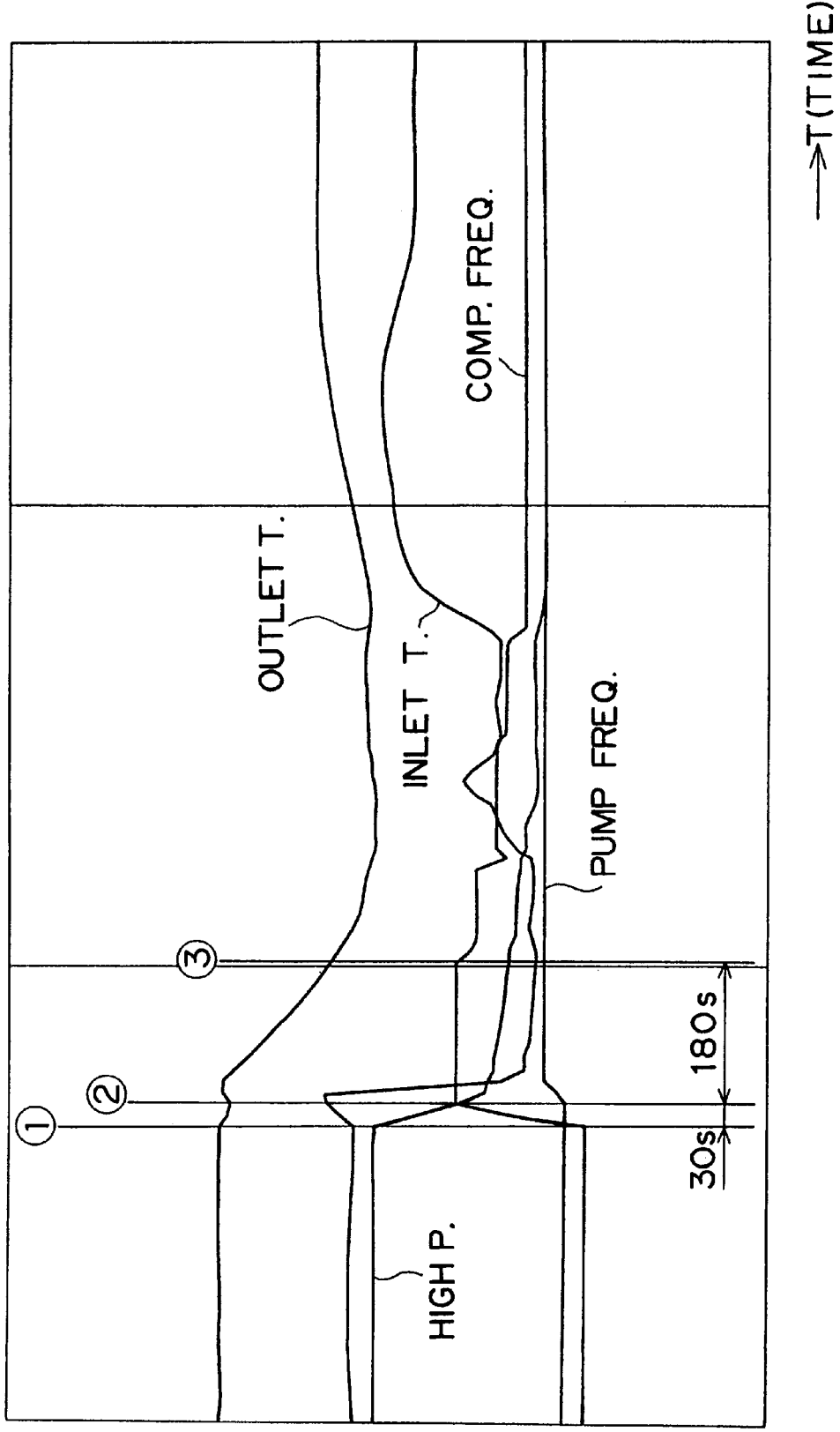
FIG. 12 is a graph showing the changes in various parameters resulting from a significant change in the high pressure level of the refrigerant when one indoor unit is operating, and a second indoor unit is then turned on, in the air conditioning system shown in FIG. 1.

More specifically, the data graphed in FIG. 12 were obtained when an indoor unit with a 2.2 kW rated capacity was turned on while an indoor unit with a 3.2 kW capacity was already running. The compressor frequency, preferred combustion level (K), and other specific parameters changed as follows.

(1) When the 2.2 kW unit was turned on at time T(1) in FIG. 12, and the 3.2 kW unit fan was on HIGH, compressor frequency went from 36 Hz to 61 Hz.

(2) By time T(2), the expansion valve of the 2.2 kW unit opened from an 80 to a 350 pulse equivalent, and combustion (K) dropped from 98 to 80.

(3) By time T(3), compressor frequency went from 61 Hz to 54 Hz.

When operation changed from single room to two room operation, there was a significant change (drop) in the compressor outlet pressure, which directly affects refrigerant circulation, between time points (1) and (2) as shown in FIG. 12. However, by increasing the compressor frequency to 61 Hz, and further opening the expansion valve for the newly started indoor unit after a slight delay, the solenoid pump frequency and combustion are gradually increased. The balance between refrigerant circulation and combustion is thus not noticeably disturbed. While there is also a slight drop in both the inlet temperature (refrigerant heater outlet temperature) and outlet temperature of the compressor, the drop is not significant.

Figure 13:
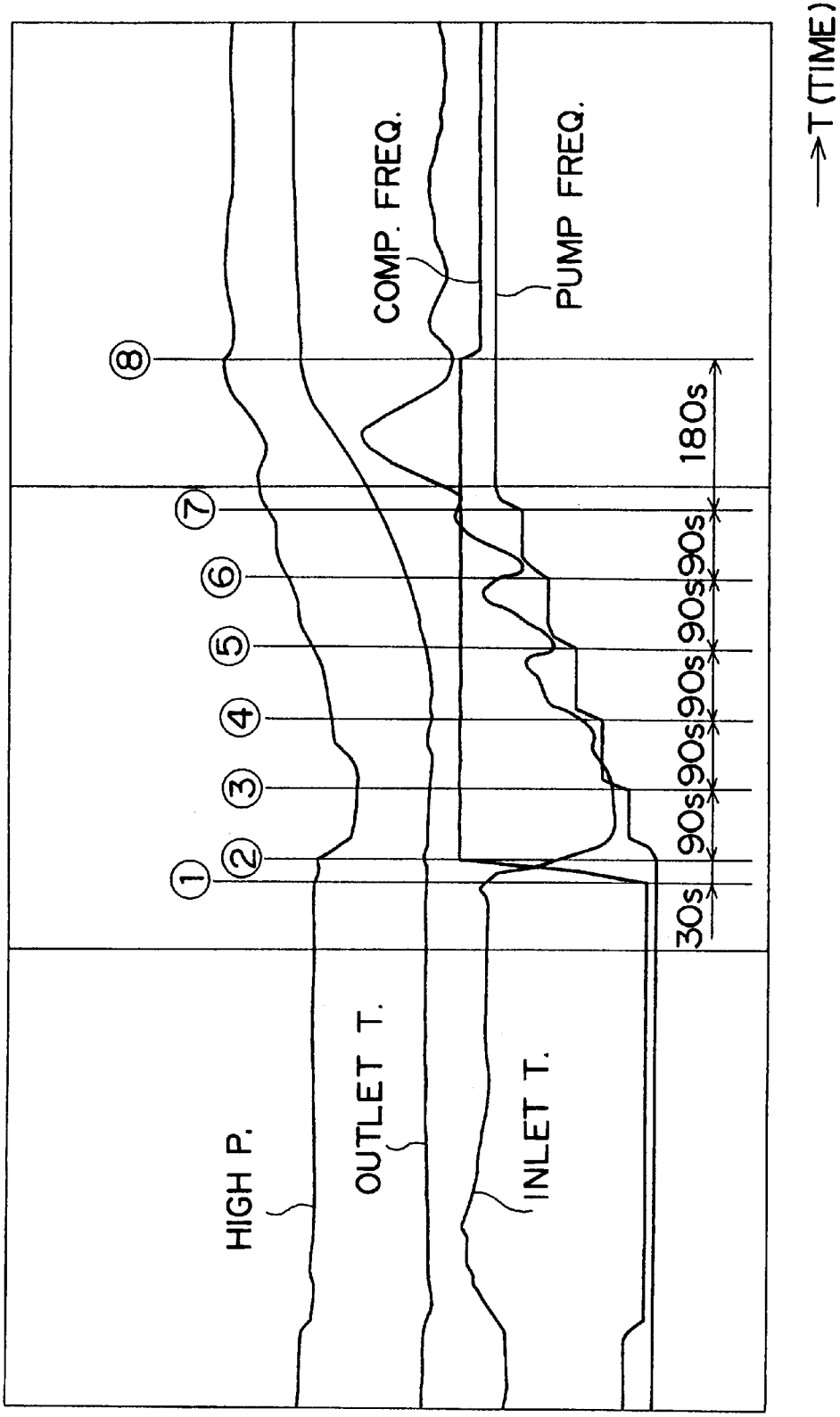
FIG. 13 is a graph showing the changes in various parameters resulting from a significant change in the combustion level of the refrigerant heater when one indoor unit is operating, and a second indoor unit is then turned on, in the air conditioning system shown in FIG. 1.

Results obtained when the 2.2 kW indoor unit was operating and a separate 3.2 kW indoor unit was then turned on are graphed in FIG. 13. The compressor frequency, preferred combustion level (K), and other specific parameters are again shown below.

(1) At time T(1), the 3.2 kW unit turned on, and compressor frequency went from 24 Hz to 61 Hz.

(2) At time T(2), the expansion valve opening of the 3.2 kW unit opened from an 80 to a 480 pulse equivalent.

(2)–(7) From time T(2) to (7), combustion (K) decreased in steps to K=40.

As shown in FIG. 13, a significant change in combustion can be achieved by increasing the solenoid pump frequency in discrete steps. However, there is not a significant change in the high pressure, nor is a significant change in either the intake temperature or outlet temperature observed. This is because before the solenoid pump frequency is increased, the compressor frequency is increased to 61 Hz, and then the opening of the expansion valve for the indoor unit that was just turned on is appropriately adjusted.

Figure 14:
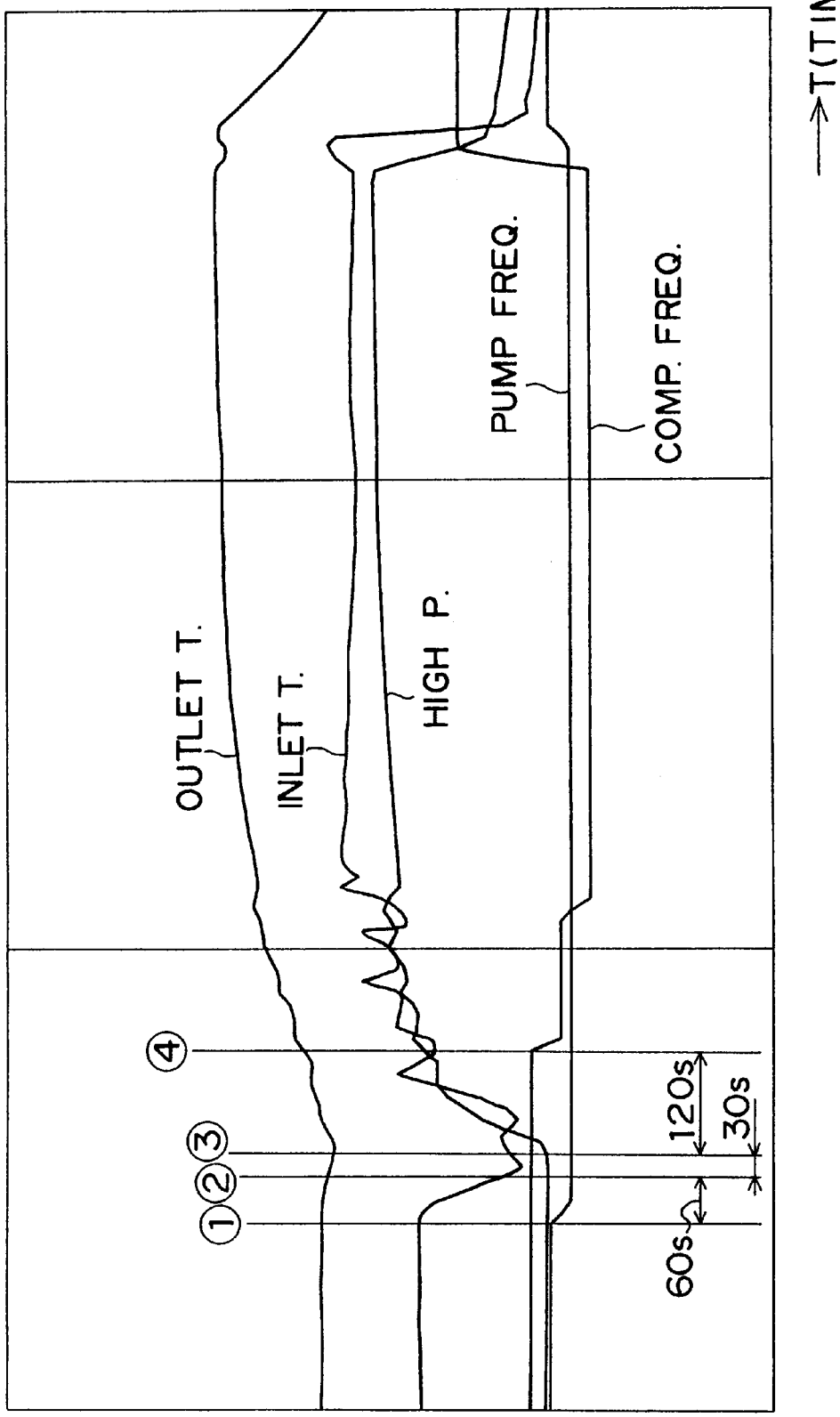
FIG. 14 is a graph showing the changes in various parameters resulting from a significant change in the high pressure level of the refrigerant when two indoor units are operating, and one indoor unit is then turned off, in the air conditioning system shown in FIG. 1.

Results obtained when both the 2.2 kW and 3.2 kW indoor units were operating, and the 2.2 kW unit was then turned off, are graphed in FIG. 14. The compressor frequency, preferred combustion level (K), and other specific parameters are again shown below.

(1) At time T(1), combustion K changed from 80 to 98.
(2) At time T(2), the 2.2 kW unit valve opening closed from a 350 to an 80 pulse equivalent.
(3) At time T(3), the 2.2 kW unit turned off, and the 3.2 kW unit fan switched to low.
(4) At time T(4), compressor frequency dropped from 48 Hz to 42 Hz.

Figure 11:
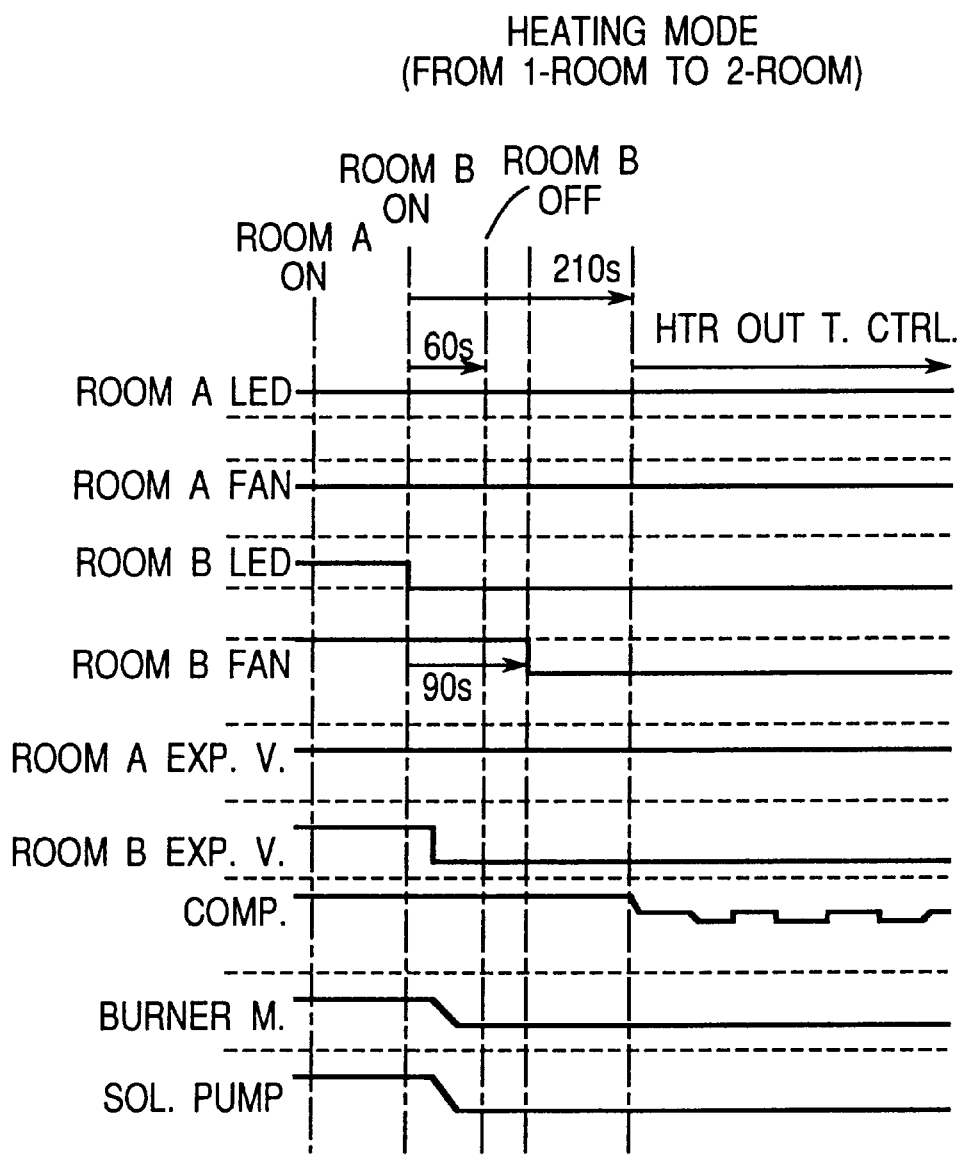
FIG. 11 is a timing chart used to describe the control process implemented when two indoor units are operating in a heating mode, and one indoor unit is then turned off, in the air conditioning system shown in FIG. 1.

While there is a significant change in the high pressure in this case as shown in FIG. 14, a sudden change in the intake temperature and outlet temperature can be prevented by controlling the system components based on the timing chart shown in FIG. 11.

Figure 15:
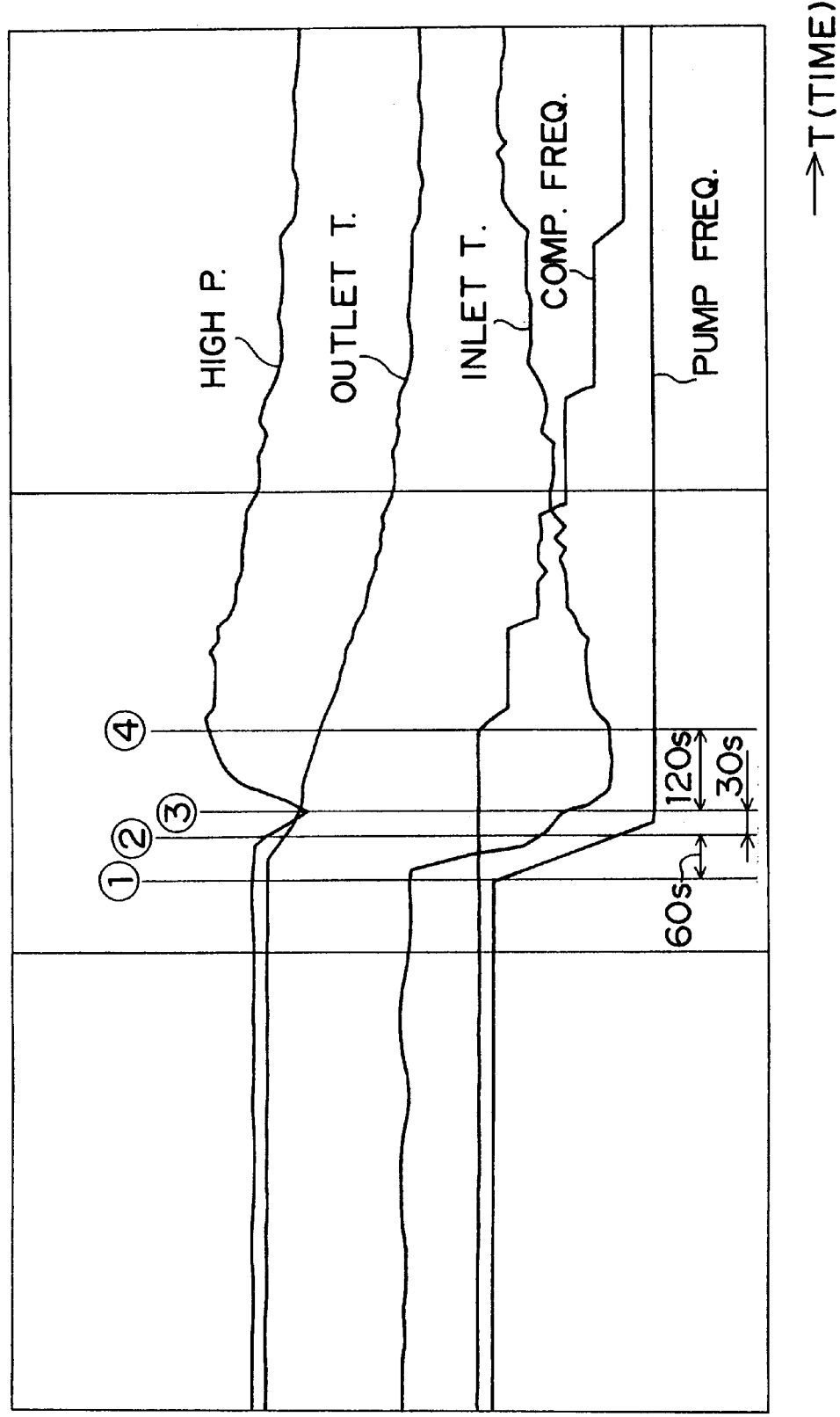
FIG. 15 is a graph showing the changes in various parameters resulting from a significant change in the combustion level of the refrigerant when two indoor units are operating, and eon indoor unit is then turned off, in the air conditioning system shown in FIG. 1.

Results obtained when both the 2.2 kW and 3.2 kW indoor units were operating, and the 3.2 kW unit was then turned off, are graphed in FIG. 15. The compressor frequency, preferred combustion level (K), and other specific parameters are again shown below.

(1) At time T(1), combustion K changed from K=40 to the maximum combustion level.
(2) At time T(2), the 3.2 kW unit valve opening closed from a 480 to an 80 pulse equivalent.
(3) At time T(3), the 3.2 kW unit turned off.
(4) At time T(4), compressor frequency dropped from 58 Hz to 52 Hz.

While there is a significant change in combustion as a result of decreasing the solenoid pump frequency in this case as shown in FIG. 15, a sudden change in the high pressure, intake temperature and outlet temperature can be prevented by controlling the system components based on the timing chart shown in FIG. 11.

It will also be obvious to those skilled in the art that while the preferred embodiment of the invention as described above has two indoor units connected to one outdoor unit in a multi-room air conditioning system, the number of indoor units shall not be limited to two, and substantially the same control method can be applied whether there are two, three, or more indoor units.

Comprised as described above, a multi-room air conditioning system according to the present invention offers the following benefits and advantages.

Based on a differential temperature calculated by a differential temperature calculating means and a rated capacity stored in a rated capacity memory means, a load level for each indoor unit is first read from a first load coefficient table. A sum of the load levels is then multiplied by a predetermined constant and a compensation value is added thereto to obtain a frequency value to thereby control the compressor. Also, based on the calculated frequency value, a target combustion level is set to control the refrigerant heater. By this construction, the compressor frequency can be controlled by the same control method whether the system is in cooling mode operation or in heating mode operation, thus facilitating control and the preparation of a program and reducing the capacity of a microcomputer required for control. Also, because both the compressor frequency and the amount of combustion can be determined according to the demand loads of the indoor units, an effective operation be readily realized. Furthermore, by maintaining the heat balance between the heat added by the refrigerant heater and the heat dissipation capacity of refrigerant circulation in a slightly wet condition, even if the refrigeration cycle changes abruptly, the outlet temperature of the refrigerant heater can be maintained appropriately, making it possible to optimize system operation at all times.

Easy control and reduction of the microcomputer capacity can be also accomplished by the fact that the expansion valves are controlled by first reading a load level for each indoor unit from a load coefficient table and then determining the opening of each expansion valve as a product of the load level and an initial opening read from an initial opening table.

Moreover, whether the system is in cooling or dehumidification mode operation or in heating mode operation, the compressor frequency is determined by predetermined equations according to the number of operating units. The predetermined equations enable low-input single room operation by operating the compressor at a lower frequency and give consideration to line pressure loss during high-frequency operation, ensuring a desired refrigerant circulation. That is, because the compressor frequency is optimized according to the number of operating units, not only can high-efficiency operation be realized, but also an abnormal temperature rise at the refrigerant heater outlet can be avoided.

Also, when the compressor frequency is identical during heating mode operation, the combustion level is set higher as the number of operating units is reduced. Accordingly, even if line pressure loss is increased by a reduction in the number of operating units, a reduction in the operating efficiency is avoided.

The provision of an operation load determination means for controlling the amount of oil to be supplied from an oil supply unit or the amount of air to be supplied from an air supply unit according to a demand load of each indoor unit enables comfortable air conditioning for each room in an oil-using multi-room air conditioning system.

The use of an oil-using refrigerant heater on the suction side of a variable capacity compressor provides comfortable air conditioning at a reduced operating cost.

Because an expansion valve having a controllable opening is installed in each of a plurality of fluid distribution lines, air conditioning for each room can be effectively accomplished.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multi-room air conditioning system comprising:
an outdoor unit having a variable capacity compressor, a four-way valve, an outdoor heat exchanger, and a refrigerant heater;
a plurality of indoor units each having an indoor heat exchanger and connected in parallel to said outdoor unit;
a primary fluid line mounted in said outdoor unit to allow a liquid refrigerant to flow therethrough;
a primary gas line mounted in said outdoor unit to allow a gas refrigerant to flow therethrough;
a plurality of fluid distribution lines branched from said primary fluid line for connecting said outdoor unit with said plurality of indoor units;
a plurality of gas distribution lines branched from said primary gas line for connecting said outdoor unit with said plurality of indoor units;
a plurality of motor-driven expansion valves installed in said plurality of fluid distribution lines, respectively;

a room temperature setting means for setting a desired temperature of a room in which each indoor unit is installed;

a room temperature detecting means for detecting a room temperature;

a differential temperature calculating means for calculating a differential temperature between the temperature set by said room temperature setting means and the room temperature detected by said room temperature detecting means;

a rated capacity memory means for storing a rated capacity of each indoor unit;

a compressor frequency and combustion control calculating means for calculating a compressor frequency and a target combustion level of said refrigerant heater at regular time intervals; and said compressor frequency and combustion control calculating means reading a first load level for each indoor unit from a first load coefficient table using the differential temperature calculated by said differential temperature calculating means and the rated capacity stored in said rated capacity memory means, said compressor frequency and combustion control calculating means multiplying a sum of the first load levels by a predetermined constant and adding a compensation value thereto to obtain a frequency value to thereby control said compressor, said compressor frequency and combustion control calculating means also setting the target combustion level using the frequency value to thereby control said refrigerant heater.

2. The multi-room air conditioning system according to claim 1, further comprising a valve opening calculating means for calculating an opening of each expansion valve, said valve opening calculating means reading an initial opening of each expansion valve from an initial opening table indicative of the initial opening of said expansion valves using the rated capacity stored in said rated capacity memory means, said valve opening calculating means also reading a second load level for each indoor unit from a second load coefficient table using the differential temperature calculated by said differential temperature calculating means and the rated capacity, said valve opening calculating means determining the opening of each expansion valve as a product of the initial opening and the second load level both read thereby to control each expansion valve.

3. The multi-room air conditioning system according to claim 1, wherein the compressor frequency is determined as follows during cooling or dehumidification mode operation:

single room operation: $Hz = a1 \times (\text{load level}) + b1$;

2-room operation: $Hz = a1 \times (\text{sum of load levels}) + b1$, when the sum of the load levels is smaller than a predetermined value; and 2-room operation: $Hz = a2 \times (\text{sum of load levels}) + b2$, when the sum of the load levels is equal to or greater than the predetermined value, where $a1$, $a2$, $b1$, and $b2$ are constants, $a1 > a2$, $b1 < b2$, and Hz is the compressor frequency.

4. The multi-room air conditioning system according to claim 1, wherein the compressor frequency is determined as follows during heating mode operation:

single room operation: $Hz = a3 \times (\text{load level}) + b3$; and 2-room operation: $Hz = a4 \times (\text{sum of load levels}) + b4$, where $a3$, $a4$, $b3$, and $b4$ are constants, $a3 > a4$, $b3 < b4$, and Hz is the compressor frequency, wherein when the total load level is smaller than a predetermined level, the compressor frequency is increased during 2-room operation relative to during single room operation, and when the total load level is equal to or greater than the predetermined level, the compressor frequency is increased during single room operation relative to during 2-room operation.

5. The multi-room air conditioning system according to claim 1, wherein when the compressor frequency is identical during heating mode operation, a combustion level is set higher as the number of operating units is reduced.

6. The multi-room air conditioning system according to claim 4, wherein when the compressor frequency is identical during heating mode operation, a combustion level is set higher as the number of operating units is reduced.

7. A multi-room air conditioning system comprising:

an outdoor unit having a variable capacity compressor, a four-way valve, an outdoor heat exchanger, a refrigerant heater for heating a refrigerant with an oil, and an oil supply unit for supplying said refrigerant heater with the oil;

a plurality of indoor units each having an indoor heat exchanger and connected in parallel to said outdoor unit;

a primary fluid line mounted in said outdoor unit to allow a liquid refrigerant to flow therethrough;

a primary gas line mounted in said outdoor unit to allow a gas refrigerant to flow therethrough;

a plurality of fluid distribution lines branched from said primary fluid line for connecting said outdoor unit with said plurality of indoor units;

a plurality of gas distribution lines branched from said primary gas line for connecting said outdoor unit with said plurality of indoor units;

a plurality of expansion valves installed in said plurality of fluid distribution lines, respectively, and each having a controllable opening; and an operation load determination means for controlling an amount of oil to be supplied from said oil supply unit according to a demand load of each indoor unit.

8. The multi-room air conditioning system according to claim 7, further comprising an air supply unit mounted in said outdoor unit for supplying said refrigerant heater with combustion air, wherein said operation load determination means also controls an amount of air to be supplied from said air supply unit.

9. A multi-room air conditioning system comprising:

an outdoor unit having a variable capacity compressor, a four-way valve, an outdoor heat exchanger, and a refrigerant heater disposed on a suction side of said compressor for heating a refrigerant with an oil;

a plurality of indoor units each having an indoor heat exchanger and connected in parallel to said outdoor unit;

a primary fluid line mounted in said outdoor unit to allow a liquid refrigerant to flow therethrough;

a primary gas line mounted in said outdoor unit to allow a gas refrigerant to flow therethrough;

a plurality of fluid distribution lines branched from said primary fluid line for connecting said outdoor unit with said plurality of indoor units; and a plurality of gas distribution lines branched from said primary gas line for connecting said outdoor unit with said plurality of indoor units.

10. The multi-room air conditioning system according to claim 9, further comprising a plurality of expansion valves installed in said plurality of fluid distribution lines, respectively, and each having a controllable opening.

* * * * *